July 2, 1929.　　　　G. WILSON　　　　1,719,157
SPRAGGING DEVICE FOR MOTOR VEHICLES
Filed Jan. 5, 1928　　　2 Sheets-Sheet 1
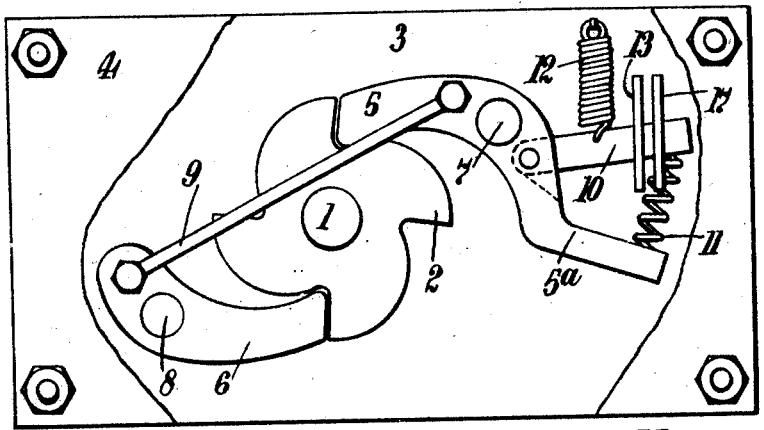
Fig. 1.
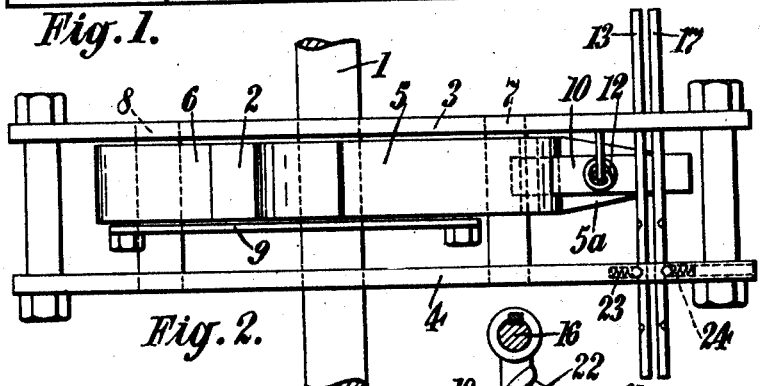
Fig. 2.
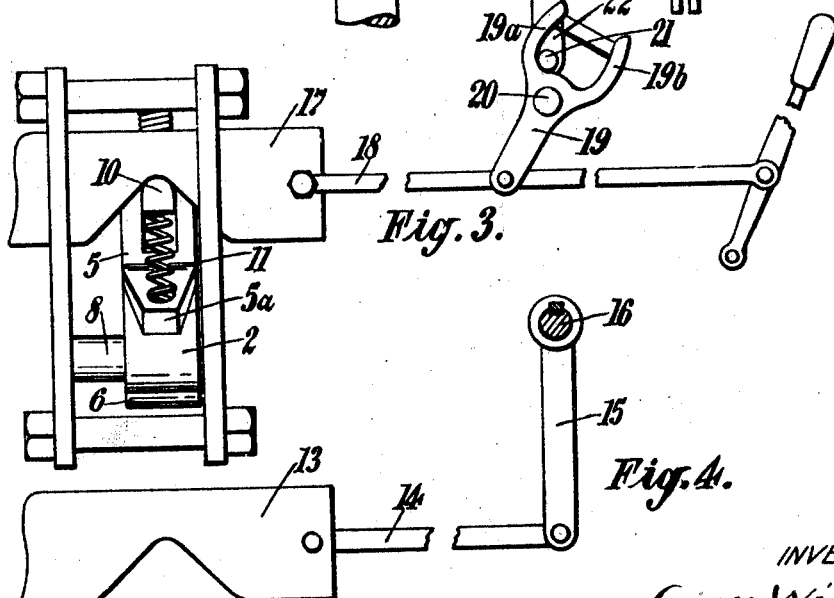
Fig. 3.
Fig. 4.
INVENTOR:
George Wilson
BY
ATTORNEY July 2, 1929.  G. WILSON  1,719,157
SPRAGGING DEVICE FOR MOTOR VEHICLES
Filed Jan. 5, 1928    2 Sheets-Sheet 2
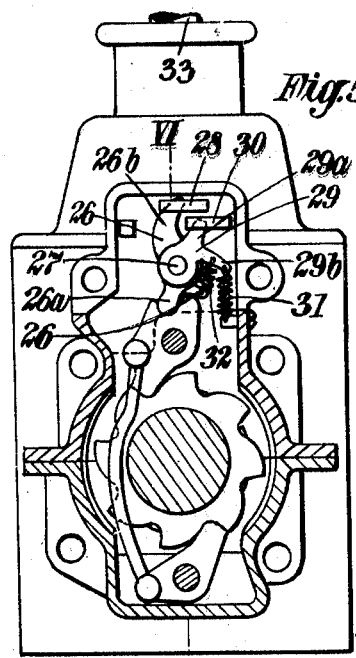
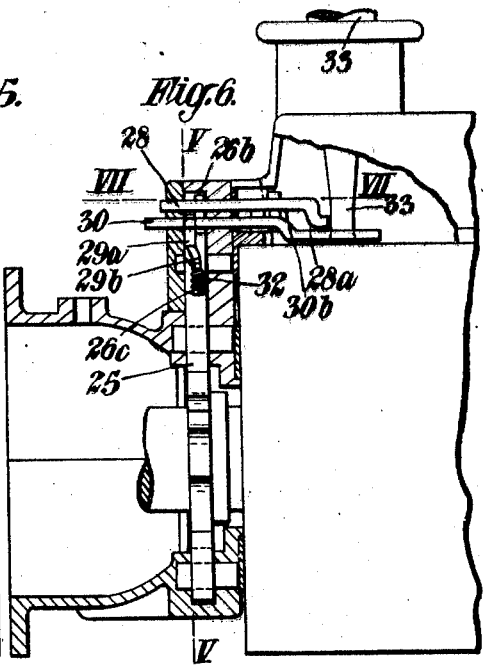
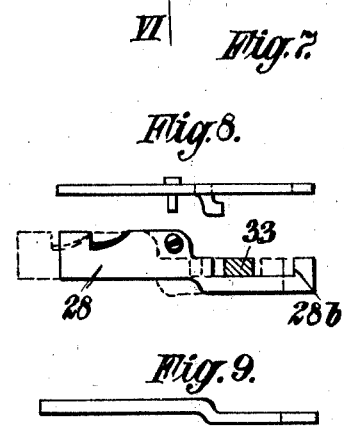
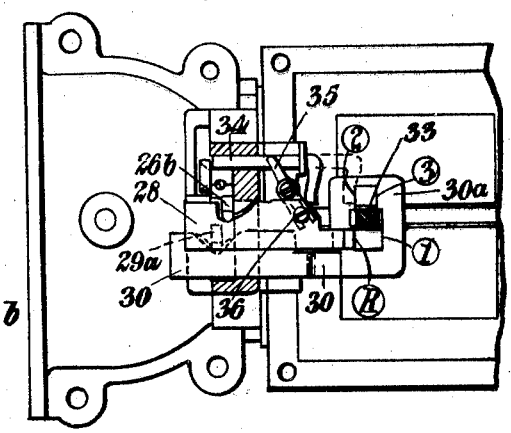
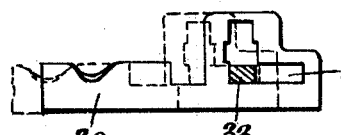
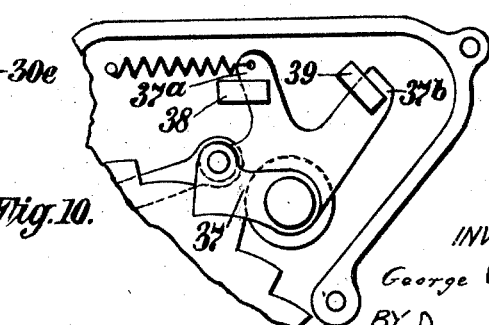
INVENTOR:
George Wilson
BY
ATTORNEY Patented July 2, 1929.

1,719,157

UNITED STATES PATENT OFFICE.

GEORGE WILSON, OF NEWCASTLE-ON-TYNE, ENGLAND, ASSIGNOR TO MOTOR SAFETY AND FREE GEAR COMPANY LIMITED, OF NEWCASTLE-ON-TYNE, ENGLAND, A COMPANY OF GREAT BRITAIN AND IRELAND.

SPRAGGING DEVICE FOR MOTOR VEHICLES.

Application filed January 5, 1928, Serial No. 244,703, and in Great Britain January 8, 1927.

This invention relates to spragging devices for motor vehicles of the kind comprising a free wheel clutch mechanism and means actuated from the change gear lever (hereinafter referred to as the gear lever) for operating the engagement means, for example a pawl mechanism, between the free wheel clutch members so as to render the said clutch inoperative for certain positions of the gear lever. Such devices are referred to hereinafter and in the claims as "of the kind described".

The object of the present invention is to provide a device of the kind described which will be positive in operation and having means whereby manœuvring of a vehicle may be carried out without a driver's having to alter his usual methods of handling a car. Then with a view to reducing wear of the device to a minimum, another object is to provide means whereby the device will be operative only when the vehicle is in a condition when it can move backwards out of control. A further object of the invention is to provide means whereby the device may be rendered operative when the gear lever is in one forward gear position, preferably first, with a view to facilitating starting off from a standstill when the vehicle is facing up an incline.

The invention will now be described with reference to the accompanying drawings in which:—

Fig. 1 is an end elevation of one form of construction according to the invention, of the clutch portion of the device.

Fig. 2 is a plan of Fig. 1.

Fig. 3 is a side view of Fig. 1, and also shows the connection of a clutch control plate to the change gear lever shaft.

Fig. 4 is a side elevation showing the connection of another clutch control plate with the gear lever shaft.

Fig. 5 is an end elevation in section taken on the line V—V of Fig. 6, of another form of construction of the invention applied to a gear box having a centre universal ball gear lever mechanism.

Fig. 6 is a side elevation partly in section taken on the line VI—VI of Fig. 5.

Fig. 7 is a plan view partly in section taken on the line VII—VII of Fig. 6.

Figs. 8 and 9 are detail views of alternative forms of clutch control plates.

Fig. 10 is a view of another controlling pawl.

Referring more particularly to Figs. 1 to 4 of the drawings, the numeral 1 indicates the main shaft of a gear box, and 2 is a ratchet wheel rigidly mounted on said shaft and between members 3 and 4 of a frame which may be arranged either inside the gear box or suitably housed immediately behind the gear box. Two pawls 5 and 6 are pivoted at 7 and 8 to engage with the ratchet wheel 2, the pivot pins 7, 8 being arranged diametrically opposite to one another about the shaft 1. The said pawls are connected by a link 9 to ensure that the movement of the one pawl 5, hereinafter referred to as the controlling pawl, sets up a similar movement in the other pawl 6. It is obvious that more than two interconnected pawls may be used.

The controlling pawl 5 has an additional member 10 pivotally mounted thereon and on the side of the pin 7 remote from the ratchet wheel, the member 10 with an extension 5ª of the said pawl forming a fork, while a spring 11 serves to hold the two sides of the fork apart. A tension spring 12 maintains the member 10 against a shoulder on the pawl 5 and so tends to keep the pawls in engagement with the ratchet wheel 2.

The control of the pawls 5 and 6 is effected by means of a plate 13 having a V-notch formed thereon (Fig. 4), the said plate coacting with the resilient member or arm 10 and through the spring 11 with the pawl 5. The plate 13 is arranged to move at right angles to the arm 10, so that when the notch is over the resilient arm as shown the arm is in its elevated position and the pawls are in engagement with the ratchet wheel. The plate 13 is operatively connected to the change gear lever so that the position of the notch will vary according to the position of said lever in its to and fro movement, while, if desired, the plate 13 may be disengaged from the gear changing mechanism. Fig. 4 shows the plate 13 connected by a link 14 to an arm 15 keyed to but a sliding fit on a gear lever shaft 16.

A second sliding plate 17 similar to the plate 13 is arranged alongside the latter and is connected by a link 18 to a forked lever 19 pivoted at 20 (Fig. 3). The forked portion of the lever 19 comprises two prongs 19$^a$, 19$^b$ adapted to coact with a pin 21 projecting, on both sides if desired, from an arm 22 keyed to the change gear lever shaft 16. This second sliding plate is brought into action only when the gear lever is placed in certain selected positions according to the number of gears employed in the various makes of cars to which the invention may be applied, and is especially arranged relatively to the gear lever so as to prevent the pawls coming into contact with the ratchet wheel while the gear lever is passing through the neutral position after the reverse gear has been in operation.

The operation of the device is as follows:—
When any of the gears are engaged the lower edge of the plate 13 at either the one side or the other of the notch is in contact with the resilient arm 10 of the controlling pawl 5, and depresses same, thereby compressing the spring 11, such pressure being communicated through the spring 11 to the controlling pawl so that the pawls are moved clear of the ratchet wheel 2.

When the gear lever is moved to the neutral position the plate 13 is moved to allow the notch to come opposite the arm 10 of the pawl 5, thereby allowing the pawls to engage with the ratchet wheel.

The object in fitting the controlling pawl 5 with the arm 10 is to ensure free movement of the gear lever in the event of the pawls being locked in the ratchet wheel when the gear has been missed and the vehicle chocked. In such a case the change gear lever is moved to engage first gear and immediately the vehicle moves forward the pawls automatically disengage and allow any further change of gears to be made.

When the gears are employed to reverse the direction of travel of the vehicle, the gear lever is moved laterally so that the pin 21 (Fig. 3) engages the forked portion of the lever 19, after which the gear lever is moved to the "reverse" position. This causes the pin 21 to press against the prong 19$^a$ so that the plate 17 is thus also brought into action and presses against the arm 10, i. e., both plates are acting simultaneously on this part of the pawl, (except in cases where the plate 13 is disengaged from control by the change lever mechanism). On moving the gear lever out of reverse position the plate 17 remains stationary owing to the space between the prongs 19$^a$ and 19$^b$ of the lever 19, which allows the pin 21 to move freely without moving the said lever. Hence the plate 17 continues to control the pawls until the gear lever passes completely through the neutral position into the position to engage first gear, when the prong 19$^b$ will be pressed by the pin 21 and the lever 19 rocked so as to restore the plate 17 to its normal or inoperative position, the plate 13 maintaining the pawls out of engagement with the ratchet wheel 2. The driver is thus prevented from inadvertently allowing the pawls to engage the ratchet wheel on passing through the neutral position before the vehicle has been brought to a standstill.

It will be seen that a vehicle fitted with the above appliance cannot run backwards downhill through the driver missing the gears in attempting to make changes from one gear to another; also that the action of the appliance is positive and automatic and entails no extra action on the part of the driver, beyond the ordinary changing gear operations, for the reason that the pawls always engage the ratchet wheel during the period in which the change gear lever is in the neutral position. In the case where the plate 13 is arranged to be capable of disengagement from control by the gear lever the pawls will operate when first gear is engaged in addition to their operation when gear lever is in the neutral position, thereby providing an additional safeguard for vehicles with very heavy loads.

The only occasions when the pawls are inoperative when the gear lever is in the neutral position are immediately after the reverse gear has been engaged or if the additional hand lever or pedal has been employed. In such cases the pawls remain inoperative until the gear lever is moved to engage first gear and then back to neutral when the pawls immediately resume operation automatically.

Spring loaded catches 23, 24 are employed to hold the notched plates and connections in correct position when such are disengaged from control by the gear lever.

The additional hand lever may be connected to the forked lever 19 as shown in Fig. 3. This lever is useful when it is desired to push the vehicle to and fro by hand, for example when manœuvring in a garage.

Referring to the construction shown in Figs. 5 to 7 of the drawings, the arrangement of the ratchet and pawl mechanism is similar to that above set forth with reference to Figs. 1 to 4 and is housed in a casing on the outside of the gear box. The numeral 25 indicates the controlling pawl which is actuated by means of a rocking lever 26 pivoted about a pin 27. The lever 26 has an arm 26$^a$ with a cylindrical end, which engages a corresponding recess in the pawl 25. A second arm 26$^b$ on the lever 26 is adapted to cooperate with a sliding plate 28 corresponding to the plate 17 of Figs. 1 to 4. The lever 26 is recessed at its hub and cut away for about half its thickness at its upper portion to receive a lever 29 which is also pivoted about the pin 27, the arm 29$^a$ of said lever being adapted to cooperate with a second sliding plate 30 corresponding to the plate 13 of Figs. 1 to 4.

A second arm 29$^b$ of the lever 29 is connected to the casing by means of a tension spring 31, and to an arm 26$^c$ of the lever 26 by means of a second tension spring 32. The lever 29 corresponds to the resilient arm 10 of Fig. 1. The spring 31 acts on the lever 26 through the arm 29$^b$ which abuts against the shoulder formed by cutting away the lever 26 above the recessed portion.

The plate 30 has a lateral extension 30$^a$ which is slotted as shown to receive the end of a gear lever 33. One of the edges of the plate 30 is notched as shown to coact with the arm 29$^a$, the relative positions of the notch and slot being such that when the lever 33 is in neutral the arm 29$^a$ lies in the notch and thus allows the pawls to engage the ratchet wheel. Movement of the lever 33 out of neutral will thus render the free wheel clutch inoperative. The plate 30 is cranked as shown in Fig. 6 to form an abutment 30$^b$ for cooperation under certain conditions with the plate 28, as will be hereinafter described.

The plate 28 has a one way notch formed on its side which normally receives the end of the arm 26$^b$. The forward end of the said arm is cranked to form an abutment 28$^a$ which is adapted to cooperate with the shoulder 30$^b$ on the plate 30. The front end face of the plate 28 is adapted to abut with the gear lever 33 when the latter is moved to reverse, which movement is to the left of Fig. 7, the position shown being neutral.

It will be seen that when the gear lever 33 is moved into any of the three forward gears (indicated by labels) the plate 30 only will move and thus render the pawls inoperative. When the lever 33 is moved to reverse the plate 28 additionally comes into action so that both plates render the pawls inoperative. When the lever 33 is restored to neutral the plate 30 moves out of the controlling position, but the plate 28 remains in the new position so that the pawls still remain inoperative. When the lever 33 is moved into first gear position the shoulder 30$^b$ on the plate 30 abuts against the shoulder 28$^a$ of the plate 28 and causes the latter to be restored to its normal position.

To prevent the plate 28 remaining in its operative position in the event of the lever 33 being moved into second gear without going into first, an L-shaped bar 34 is arranged for sliding movement parallel with the plates 28 and 30. A forked lever 35 is pivotally mounted between the bar 34 and plate 28, the forked end engaging a set screw 36 in the plate 28, while the other end of the said lever projects into an opening in the bar 34.

With this arrangement, when the plate 28 is pushed to the right for reverse gear selection, it will rock the lever 35 and cause the bar 34 to be moved to the position indicated in dotted lines. If therefore the gear lever 33 be moved direct from reverse to a second gear, the lever 33 having to be moved transversely first, the extension of the L-bar 34 will be engaged by the said lever and the bar 34 moved to the left, so that the lever 35 is rocked and the plate 28 restored to its normal position.

Figs. 8 and 9 show an alternative pair of plates 28 and 30, which are used where it is desired to have the spragging device operative while the first gear is in engagement. Both plates are extended at their front ends to provide for a lost motion movement, the plate 28 having an abutment 28$^b$ and the plate 30 a slot at 30$^c$. The relative positions of the plates and gear lever as shown are the normal neutral positions. The dotted lines show the abnormal neutral positions of the plates or the position of the plates when the gear lever 33 has been moved into reverse and then moved back to neutral. Movement of the gear lever 33 from this position into first gear will move the plates 28 and 30 with it, so that the pawls will again be operative. It should be noticed that from the abnormal neutral position the gear lever 33 cannot be moved transversely to engage either second or third gears—it must first go into first gear position—so that with this form the lever 35 and bar 34 are unnecessary.

Fig. 10 shows a form of controlling pawl 37, the controlling arms 37$^a$ and 37$^b$ of which are rigid therewith. The numerals 38 and 39 indicate the cam plates. This form is used where it is desired to have the device in operation while the first gear is in engagement. The vehicle will therefore always be moving before the pawls are to be rendered inoperative for the second and higher gears, so that the resilient arm is unnecessary.

I claim:—

1. A spragging device for motor vehicles of the kind described, comprising a lost motion mechanism operatively interposed between the clutch engagement means and the gear lever so that when the gear lever goes into reverse the clutch is rendered inoperative and remains so until the gear lever has entered another gear position.

2. A spragging device according to claim 1, wherein means are provided whereby for normal running of a vehicle the spragging device is thrown into action only when the gear lever is in the neutral position.

3. A spragging device according to claim 1, wherein means are provided whereby for normal running of a vehile the spragging device is thrown into action only when the gear lever is in the neutral position and in one forward gear position.

4. A spragging device of the kind described including a free wheel clutch and a gear lever, and means operatively connecting the engagement means of the said clutch with the gear lever whereby the clutch may be rendered operative or inoperative according to the position of said lever, a lost motion mechanism, and means for operatively connecting said mechanism on the one hand to the clutch engagement means and on the other hand to the gear lever.

5. A spragging device of the kind described including a free wheel clutch and a gear lever, and means operatively connecting the engagement means of the said clutch with the gear lever whereby the clutch may be rendered operative or inoperative according to the position of said lever, a lever, a forked arm on said lever, means connected with the gear lever on the one hand and on the other engaging in said forked arm with lost motion, and means connecting the other arm of said lever to the clutch engagement means.

6. A spragging device of the kind described including a free wheel clutch and a gear lever, and means operatively connecting the engagement means of the said clutch with the gear lever whereby the clutch may be rendered operative or inoperative according to the position of said lever, a lost motion mechanism, means for operatively connecting said mechanism on the one hand to the clutch engagement means and on the other hand to the gear lever, and a hand lever and means operatively connecting said hand lever to the lost motion mechanism.

7. A spragging device of the kind described including a free wheel clutch and a gear lever, resilient controlling means associated with the engagement means of said clutch, and means for operatively connecting said resilient means with the gear lever.

8. A spragging device of the kind described including a gear lever, and means operatively connecting the clutch engagement means of the said clutch with the gear lever whereby the clutch may be rendered operative or inoperative according to the position of said lever, a lost motion mechanism, and means for operatively connecting said mechanism on the one hand to the clutch engagement means and on the other hand to the gear lever.

9. A spragging device according to claim 8 wherein the camming means comprises two sliding members each having a cam portion on one of its sides, means for connecting one of said sliding members with the gear lever, a lost motion mechanism, and means for connecting said lost motion mechanism with the other sliding member on the one hand and with the gear lever on the other hand.

10. A spragging device of the kind described including a gear lever, two cam plates coacting with the clutch engagement means, a transverse slot in the one plate adapted to receive the gear lever, the other or reverse plate being adapted to abut against one side of the gear lever when said lever is moved from neutral to reverse, and abutments on each plate adapted to coact with one another to restore the reverse plate to neutral on movement of the gear lever from neutral into first gear after reverse has been engaged.

11. A spragging device according to claim 10, an L-bar slidably mounted parallel with the cam plates, and a lever operatively interposed between the two plates, the extension member of the L-bar being adapted to abut against the gear lever when said lever is moved to a particular gear position.

12. A spragging device according to claim 10 in which the cam plates are formed at their gear lever engaging ends with lost motion portions.

13. A spragging device of the kind described including a pawl and ratchet clutch and a gear lever, and means operatively connecting the pawl mechanism of the said clutch with the gear lever whereby the clutch may be rendered operative or inoperative according to the position of said lever, a lost motion mechanism, and means for operatively connecting said mechanism on the one hand to the pawl mechanism and on the other hand to the gear lever.

14. A spragging device according to claim 13 wherein the pawl mechanism comprises a plurality of interconnected pawls equally spaced around the ratchet wheel, one of which pawls serves as a controlling pawl, and means operatively connecting said controlling pawl to the gear lever.

15. A spragging device according to claim 13 wherein the pawl mechanism comprises an even plurality of interconnected pawls equally spaced around the ratchet wheel, one of which pawls serves as a controlling pawl, and means operatively connecting said controlling pawl to the gear lever.

16. A spragging device according to claim 13 wherein the pawl mechanism comprises two diametrically opposite pawls disposed about the ratchet wheel, and a rod connecting said pawls, one of which pawls serves as a controlling pawl, and means operatively connecting said controlling pawl to the gear lever.

17. A spragging device according to claim 13, wherein the pawl mechanism includes a controlling pawl, a pivoted arm associated with said pawl, a spring interposed between said arm and said pawl and means operatively connecting said pivoted arm to the gear lever.

18. A spragging device according to claim 13, wherein the interengaging faces of the pawl and ratchet mechanism are shaped to form arcs having their centres at the pivoting point of the respective pawl.

In witness whereof I have signed this specification.

GEORGE WILSON.